United States Patent
Wu et al.

(10) Patent No.: US 7,138,025 B2
(45) Date of Patent: Nov. 21, 2006

(54) METHOD FOR MANUFACTURING A SEALABLE BAG HAVING AN INTEGRATED TRAY FOR USE IN VACUUM PACKAGING

(75) Inventors: Hongyu Wu, San Jose, CA (US); Charles Wade Albritton, Hercules, CA (US); David Brakes, Hong Kong (CN)

(73) Assignee: Tilia International, Inc., San Francisco, CA (US)

( * ) Notice: Subject to any disclaimer, the term of this patent is extended or adjusted under 35 U.S.C. 154(b) by 181 days.

(21) Appl. No.: 10/794,369

(22) Filed: Mar. 4, 2004

(65) Prior Publication Data

US 2005/0034807 A1    Feb. 17, 2005

Related U.S. Application Data

(60) Provisional application No. 60/452,171, filed on Mar. 5, 2003.

(51) Int. Cl.
*B29D 7/001* (2006.01)
*B65D 30/008* (2006.01)

(52) U.S. Cl. ............ 156/204; 156/209; 156/219; 156/227; 156/244.25; 156/292; 156/308.4; 264/171.13; 264/171.23; 383/109; 383/116

(58) Field of Classification Search ........... 156/244.25, 156/244.11, 244.16, 209, 219, 204, 227, 292, 156/308.4; 264/171.23, 171.13, 210.2, 167; 383/100, 109, 116; 426/415, 106; 206/497, 206/524.8
See application file for complete search history.

(56) References Cited

U.S. PATENT DOCUMENTS

| | | | |
|---|---|---|---|
| 274,447 A | 3/1883 | Kennish | |
| 1,938,593 A | 12/1933 | Jarrier | |
| 2,085,766 A | 7/1937 | Potdevin et al. | |
| 2,105,376 A | 1/1938 | Scott | |
| 2,265,075 A | 12/1941 | Knuetter | |
| 2,387,812 A | 10/1945 | Sonneborn et al. | |
| 2,429,482 A | 10/1947 | Munters | |
| 2,480,316 A | 8/1949 | Blair et al. | |
| 2,607,712 A | 8/1952 | Sturken | |
| 2,609,314 A | 9/1952 | Engel et al. | |
| 2,633,442 A | 3/1953 | Caldwell | |
| 2,642,372 A | 6/1953 | Chittick | |
| 2,670,501 A | 3/1954 | Michiels | |

(Continued)

FOREIGN PATENT DOCUMENTS

EP    0 723 915    7/1996

(Continued)

*Primary Examiner*—Sam Chuan Yao
*Assistant Examiner*—Barbara J Musser
(74) *Attorney, Agent, or Firm*—Perkins Coie LLP

(57) ABSTRACT

A method for manufacturing a bag for use in vacuum packaging comprises forming a first panel including a tray for retaining contents within the bag and a second panel. Optionally, the tray can include a plurality of ridges or protuberances for suspending contents such that liquid can collect in the tray. Each panel comprises a gas-impermeable base layer and a heat-sealable inner layer molded from melt-extruded resin. The first panel is overlapped with the second panel, and three of four edges of the panels are heated such that the inner layers bond at the heated edges. This description is not intended to be a complete description of, or limit the scope of, the invention. Other features, aspects, and objects of the invention can be obtained from a review of the specification, the figures, and the claims.

17 Claims, 4 Drawing Sheets

U.S. PATENT DOCUMENTS

| | | |
|---|---|---|
| 2,690,206 A | 9/1954 | Mueller |
| 2,695,741 A | 11/1954 | Haley |
| 2,759,866 A | 8/1956 | Seymour |
| 2,772,712 A | 12/1956 | Post |
| 2,776,452 A | 1/1957 | Chavannes |
| 2,778,173 A | 1/1957 | Taunton |
| 2,789,609 A | 4/1957 | Post |
| 2,821,338 A | 1/1958 | Metzger |
| 2,856,323 A | 10/1958 | Gordon |
| 2,858,247 A | 10/1958 | De Swart |
| 2,913,030 A | 11/1959 | Fisher |
| 2,916,411 A | 12/1959 | Villoresi |
| 2,960,144 A | 11/1960 | Graf |
| 3,026,231 A | 3/1962 | Chavannes |
| 3,060,985 A | 10/1962 | Vance et al. |
| 3,077,262 A | 2/1963 | Gaste |
| 3,077,428 A | 2/1963 | Heuser et al. |
| 3,098,563 A | 7/1963 | Skees |
| 3,102,676 A | 9/1963 | Danelli et al. |
| 3,113,715 A | 12/1963 | Pangrac |
| 3,135,411 A | 6/1964 | Osborne |
| 3,141,221 A | 7/1964 | Faulls, Jr. |
| 3,142,599 A | 7/1964 | Chavannes |
| 3,149,772 A | 9/1964 | Olsson |
| 3,160,323 A | 12/1964 | Weisberg |
| 3,224,574 A | 12/1965 | McConnell et al. |
| 3,237,844 A | 3/1966 | Hughes |
| 3,251,463 A | 5/1966 | Bodet |
| 3,325,084 A | 6/1967 | Ausnit |
| 3,334,805 A | 8/1967 | Halbach |
| 3,381,887 A | 5/1968 | Lowry |
| 3,411,698 A | 11/1968 | Reynolds |
| 3,423,231 A | 1/1969 | Lutzmann |
| 3,516,217 A | 6/1970 | Gildersleeve |
| 3,533,548 A | 10/1970 | Taterka |
| 3,565,147 A | 2/1971 | Ausnit |
| 3,575,781 A | 4/1971 | Pezely |
| 3,595,467 A | 7/1971 | Goglio |
| 3,595,722 A | 7/1971 | Dawbarn |
| 3,595,740 A | 7/1971 | Gerow ................ 161/254 |
| 3,600,267 A | 8/1971 | McFedries, Jr. |
| 3,661,677 A | 5/1972 | Wang .................. 156/315 |
| 3,785,111 A | 1/1974 | Pike ....................... 53/14 |
| 3,799,427 A | 3/1974 | Goglio |
| 3,809,217 A | 5/1974 | Harrison ................ 206/84 |
| 3,833,166 A | 9/1974 | Murray |
| 3,895,153 A | 7/1975 | Johnston et al. |
| 3,908,070 A | 9/1975 | Marzolf .................. 428/474 |
| 3,937,395 A | 2/1976 | Lawes ................. 229/62.5 |
| 3,958,391 A | 5/1976 | Kujubu ...................... 53/22 |
| 3,958,693 A | 5/1976 | Greene |
| 3,980,226 A | 9/1976 | Franz |
| 3,998,499 A | 12/1976 | Chiarotto |
| 4,018,253 A | 4/1977 | Kaufman |
| 4,066,167 A | 1/1978 | Hanna et al. |
| 4,098,404 A | 7/1978 | Markert |
| 4,104,404 A | 8/1978 | Bieler et al. ................ 428/35 |
| 4,105,491 A | 8/1978 | Haase et al. |
| 4,155,453 A | 5/1979 | Ono |
| 4,164,111 A | 8/1979 | Di Bernardo |
| 4,179,862 A | 12/1979 | Landolt |
| 4,186,786 A | 2/1980 | Kirkpatrick |
| 4,212,337 A | 7/1980 | Kamp |
| 4,215,725 A | 8/1980 | Callet et al. |
| 4,295,566 A | 10/1981 | Vincek ................. 206/457 |
| 4,310,118 A | 1/1982 | Kisida et al. |
| 4,340,558 A | 7/1982 | Hendrickson |
| 4,370,187 A | 1/1983 | Katagiri et al. ........ 156/244.23 |
| 4,372,921 A | 2/1983 | Sanderson et al. |
| 4,449,243 A | 5/1984 | Platel .................... 383/103 |
| 4,486,923 A | 12/1984 | Briggs |
| 4,532,652 A | 7/1985 | Herrington |
| 4,551,379 A | 11/1985 | Kerr ..................... 428/200 |
| 4,569,712 A | 2/1986 | Shibano et al. ........ 156/244.14 |
| 4,575,990 A | 3/1986 | Von Bismarck |
| 4,576,283 A | 3/1986 | Fafournoux ............. 206/524.8 |
| 4,576,285 A | 3/1986 | Goglio |
| 4,579,756 A | 4/1986 | Edgel ..................... 428/34 |
| 4,583,347 A | 4/1986 | Nielsen |
| 4,658,434 A | 4/1987 | Murray ................... 383/66 |
| 4,669,124 A | 5/1987 | Kimura |
| 4,672,684 A | 6/1987 | Barnes et al. .............. 383/45 |
| 4,683,702 A | 8/1987 | Vis ....................... 53/433 |
| 4,705,174 A | 11/1987 | Goglio |
| 4,712,574 A | 12/1987 | Perrott |
| 4,756,422 A | 7/1988 | Kristen ................. 206/524.8 |
| 4,756,629 A | 7/1988 | Tilman et al. |
| 4,778,282 A | 10/1988 | Borchardt et al. |
| 4,786,285 A | 11/1988 | Jambor |
| 4,812,056 A | 3/1989 | Zieke |
| 4,834,554 A | 5/1989 | Stetler, Jr. et al. .......... 383/100 |
| 4,841,603 A | 6/1989 | Ragni |
| 4,871,264 A | 10/1989 | Robbins, III et al. |
| 4,877,334 A | 10/1989 | Cope ........................ 383/3 |
| 4,887,912 A | 12/1989 | Stumpf |
| 4,890,637 A | 1/1990 | Lamparter |
| 4,892,414 A | 1/1990 | Ausnit |
| 4,903,718 A | 2/1990 | Sullivan |
| 4,906,108 A | 3/1990 | Herrington et al. ........... 383/71 |
| 4,913,561 A | 4/1990 | Beer ...................... 383/94 |
| 4,917,506 A | 4/1990 | Scheibner |
| 4,917,844 A | 4/1990 | Komai et al. ................ 264/85 |
| 4,941,310 A | 7/1990 | Kristen .................... 53/512 |
| 4,953,708 A | 9/1990 | Beer et al. ................. 206/632 |
| 4,973,171 A | 11/1990 | Bullard .................... 383/70 |
| 5,006,056 A | 4/1991 | Mainstone et al. ......... 425/186 |
| 5,040,904 A | 8/1991 | Cornwell ................. 583/71 |
| 5,048,269 A | 9/1991 | Deni |
| D320,549 S | 10/1991 | McKellar et al. ............ D9/311 |
| 5,053,091 A | 10/1991 | Giljam et al. |
| 5,063,639 A | 11/1991 | Boeckmann et al. |
| 5,080,155 A | 1/1992 | Crozier |
| 5,097,956 A | 3/1992 | Davis ................... 206/524.8 |
| 5,098,497 A | 3/1992 | Brinley .................. 156/219 |
| 5,106,688 A | 4/1992 | Bradfute et al. |
| 5,111,838 A | 5/1992 | Langston |
| 5,116,444 A | 5/1992 | Fox |
| 5,121,590 A | 6/1992 | Scanlan |
| 5,142,970 A | 9/1992 | ErkenBrack |
| 5,203,458 A | 4/1993 | Cornwell ................. 206/524.8 |
| 5,209,264 A | 5/1993 | Koyanagi |
| D338,399 S | 8/1993 | Conte, Jr. |
| 5,240,112 A | 8/1993 | Newburger ............... 206/524.8 |
| 5,242,516 A | 9/1993 | Custer et al. |
| 5,246,114 A | 9/1993 | Underwood |
| 5,252,379 A | 10/1993 | Kuribayashi et al. ........ 428/141 |
| 5,332,095 A | 7/1994 | Wu |
| 5,333,736 A | 8/1994 | Kawamura |
| 5,339,959 A | 8/1994 | Cornwell |
| 5,352,323 A | 10/1994 | Chi |
| 5,362,351 A | 11/1994 | Karszes ................... 156/243 |
| 5,368,394 A | 11/1994 | Scott et al. |
| 5,371,925 A | 12/1994 | Sawatsky |
| 5,373,965 A | 12/1994 | Halm et al. |
| 5,397,182 A | 3/1995 | Gaible et al. |
| 5,402,906 A | 4/1995 | Brown et al. |
| RE34,929 E | 5/1995 | Kristen ................... 206/524.8 |
| D360,578 S | 7/1995 | Dees ...................... D9/305 |
| 5,445,275 A | 8/1995 | Curley et al. ............... 206/525 |
| 5,450,963 A | 9/1995 | Carson |
| 5,480,030 A | 1/1996 | Sweeney et al. |
| 5,526,843 A | 6/1996 | Wolf et al. |
| 5,540,500 A | 7/1996 | Tanaka .................... 383/43 |
| 5,542,902 A | 8/1996 | Richison et al. ............ 493/195 |

| | | | | | | |
|---|---|---|---|---|---|---|
| 5,544,752 A | 8/1996 | Cox | | 6,074,677 A | 6/2000 | Croft ......................... 426/124 |
| 5,549,944 A | 8/1996 | Abate | | 6,076,967 A | 6/2000 | Beaudette |
| 5,551,213 A | 9/1996 | Koelsch et al. | | 6,077,373 A | 6/2000 | Fletcher et al. |
| 5,554,423 A | 9/1996 | Abate ...................... 428/35.2 | | 6,089,271 A | 7/2000 | Tani |
| 5,584,409 A | 12/1996 | Chemberlen | | 6,105,821 A | 8/2000 | Christine et al. |
| 5,592,697 A | 1/1997 | Young | | 6,116,781 A | 9/2000 | Skeens ......................... 383/100 |
| 5,620,098 A | 4/1997 | Boos et al. | | 6,161,716 A | 12/2000 | Oberhofer et al. |
| 5,638,664 A | 6/1997 | Levsen et al. | | 6,164,826 A | 12/2000 | Petkovsek |
| 5,655,273 A | 8/1997 | Tomic et al. | | 6,202,849 B1 | 3/2001 | Graham |
| 5,656,209 A | 8/1997 | Benz et al. | | 6,220,702 B1 | 4/2001 | Nakamura et al. |
| 5,665,456 A | 9/1997 | Kannankeril et al. | | 6,224,528 B1 | 5/2001 | Bell |
| 5,689,866 A | 11/1997 | Kasai et al. | | 6,227,706 B1 | 5/2001 | Tran |
| 5,699,936 A | 12/1997 | Sakamoto | | 6,231,234 B1 | 5/2001 | Gebhardt |
| 5,701,996 A | 12/1997 | Goto et al. ................. 206/287 | | 6,231,236 B1 | 5/2001 | Tilman |
| 5,709,467 A | 1/1998 | Galliano, II | | 6,274,181 B1 | 8/2001 | Richison et al. ............ 426/118 |
| 5,735,395 A | 4/1998 | Lo | | D451,542 S | 12/2001 | Ishizawa et al. |
| 5,749,493 A | 5/1998 | Boone et al. | | 6,357,915 B1 | 3/2002 | Anderson ..................... 383/100 |
| 5,765,608 A | 6/1998 | Kristen | | 6,402,873 B1 | 6/2002 | Fujii et al. ............. 156/244.11 |
| 5,772,034 A | 6/1998 | Lin | | 6,408,872 B1 | 6/2002 | Skeens et al. |
| 5,812,188 A | 9/1998 | Adair | | 6,423,356 B1 | 7/2002 | Richison et al. ............ 426/118 |
| 5,829,884 A | 11/1998 | Yeager ........................ 383/61 | | 6,520,071 B1 | 2/2003 | Lanza |
| 5,839,582 A | 11/1998 | Strong et al. ............ 206/524.8 | | 2001/0023572 A1 | 9/2001 | Savage et al. |
| 5,873,217 A | 2/1999 | Smith | | 2004/0000501 A1 | 1/2004 | Shah et al. |
| 5,874,155 A | 2/1999 | Gehrke et al. | | 2004/0000502 A1 | 1/2004 | Shah et al. |
| 5,881,881 A | 3/1999 | Carrington | | 2004/0000503 A1 | 1/2004 | Shah et al. |
| 5,893,822 A | 4/1999 | Deni et al. | | 2004/0007494 A1 | 1/2004 | Popeil et al. |
| 5,898,113 A | 4/1999 | Vecere .................... 73/864.62 | | | | |

FOREIGN PATENT DOCUMENTS

| | | |
|---|---|---|
| EP | 0 836 927 | 4/1998 |
| EP | 1 053 945 | 11/2000 |
| JP | 55-90364 | 7/1980 |
| JP | 62-192779 | 8/1987 |
| JP | 7-299865 | 11/1995 |
| JP | 8-90740 | 4/1996 |
| JP | 9-131846 | 5/1997 |
| JP | 9-252919 | 9/1997 |
| JP | 10034760 A | 2/1998 |
| JP | 10-138377 | 5/1998 |
| JP | 10-180846 | 7/1998 |
| JP | 11-77903 | 3/1999 |
| JP | 11-151142 | 6/1999 |
| JP | 11-254631 | 9/1999 |
| JP | 2000-15767 | 1/2000 |
| JP | 2000-218746 | 8/2000 |
| KR | 20-0248033 | 5/1995 |
| WO | WO 00/71422 | 11/2000 |
| WO | WO 02/28577 A2 | 4/2002 |
| WO | WO 02/066227 A1 | 8/2002 |
| WO | WO 02-074522 A1 | 9/2002 |
| WO | WO 2004/078609 | 9/2004 |

Remaining US entries:

| | | |
|---|---|---|
| 5,908,245 A | 6/1999 | Bost et al. |
| 5,915,596 A | 6/1999 | Credle, Jr. |
| 5,916,613 A * | 6/1999 | Stockley, III ............... 426/124 |
| 5,927,336 A | 7/1999 | Tanaka et al. |
| 5,928,762 A | 7/1999 | Aizawa et al. .............. 428/156 |
| D413,258 S | 8/1999 | Voller |
| 5,931,189 A | 8/1999 | Sweeney et al. |
| 5,941,421 A | 8/1999 | Overman et al. |
| 5,941,643 A | 8/1999 | Linkiewicz |
| 5,954,196 A | 9/1999 | Lin |
| 5,957,831 A | 9/1999 | Adair |
| 5,971,613 A | 10/1999 | Bell |
| 5,996,800 A | 12/1999 | Pratt |
| 6,021,624 A | 2/2000 | Richison et al. .............. 53/410 |
| 6,023,914 A | 2/2000 | Richison et al. .............. 53/410 |
| 6,029,810 A | 2/2000 | Chen |
| 6,030,652 A | 2/2000 | Hanus |
| 6,035,769 A | 3/2000 | Nomura et al. |
| 6,039,182 A | 3/2000 | Light |
| 6,045,006 A | 4/2000 | Fraxier et al. |
| 6,045,264 A | 4/2000 | Miniea |
| 6,053,606 A | 4/2000 | Yamaguchi et al. |
| D425,786 S | 5/2000 | Voller |
| 6,059,457 A | 5/2000 | Sprehe et al. |
| 6,070,728 A | 6/2000 | Overby et al. |

* cited by examiner

METHOD FOR MANUFACTURING A SEALABLE BAG HAVING AN INTEGRATED TRAY FOR USE IN VACUUM PACKAGING

PRIORITY CLAIM

This application claims priority to the following U.S. Provisional Patent Application:

U.S. Provisional Patent Application No. 60/452,171, entitled "METHOD FOR MANUFACTURING A SEALABLE BAG HAVING AN INTEGRATED TRAY FOR USE IN VACUUM PACKAGING," by Henry Wu, et al., filed Mar. 5, 2003.

CROSS-REFERENCE TO RELATED PATENT APPLICATIONS

This U.S. Patent Application incorporates by reference all of the following co-pending applications:

U.S. Provisional Patent Application No. 60/452,168, entitled "LIQUID-TRAPPING BAG FOR USE IN VACUUM PACKAGING," by Henry Wu, et al., filed Mar. 5, 2003;

U.S. Provisional Patent Application No. 60/452,138, entitled "METHOD FOR MANUFACTURING LIQUID-TRAPPING BAG FOR USE IN VACUUM PACKAGING," by Henry Wu et al., filed Mar. 5, 2003;

U.S. Provisional Patent Application No. 60/452,172, entitled "SEALABLE BAG HAVING AN INTEGRATED TRAY FOR USE IN VACUUM PACKAGING," by Henry Wu, et al., filed Mar. 5, 2003;

U.S. Provisional Patent Application No. 60/451,954, entitled "SEALABLE BAG HAVING AN INDICIA FOR USE IN VACUUM PACKAGING," by Henry Wu, et al., filed Mar. 5, 2003;

U.S. Provisional Patent Application No. 60/451,948, entitled "METHOD FOR MANUFACTURING A SEALABLE BAG HAVING AN INDICIA FOR USE IN VACUUM HAVING," by Henry Wu, et al., filed Mar. 5, 2003;

U.S. Provisional Patent Application No. 60/452,142, entitled "SEALABLE BAG HAVING AN INTEGRATED ZIPPER FOR USE IN VACUUM PACKAGING," by Henry Wu, et al., filed Mar. 5, 2003;

U.S. Provisional Patent Application No. 60/452,021, entitled "METHOD FOR MANUFACTURING A SEALABLE BAG HAVING AN INTEGRATED ZIPPER FOR USE IN VACUUM PACKAGING," by Henry Wu, et al., filed Mar. 5, 2003;

U.S. Provisional Patent Application No. 60/451,955, entitled "SEALABLE BAG HAVING AN INTEGRATED VALVE STRUCTURE FOR USE IN VACUUM PACKAGING," by Henry Wu, et al., filed Mar. 5, 2003;

U.S. Provisional Patent Application No. 60/451,956, entitled "METHOD FOR MANUFACTURING A SEALABLE BAG HAVING AN INTEGRATED VALVE STRUCTURE FOR USE IN VACUUM PACKAGING," by Henry Wu, et al., filed Mar. 5, 2003;

U.S. Provisional Patent Application No. 60/452,157, entitled "SEALABLE BAG HAVING AN INTEGRATED TIMER/SENSOR FOR USE IN VACUUM PACKAGING," by Henry Wu, et al., filed Mar. 5, 2003;

U.S. Provisional Patent Application No. 60/452,139, entitled "METHOD FOR MANUFACTURING A SEALABLE BAG HAVING AN INTEGRATED TIMER/SENSOR FOR USE IN VACUUM PACKAGING," by Henry Wu, et al., filed Mar. 5, 2003;

U.S. patent application Ser. No. 10/169,485, entitled "METHOD FOR PREPARING AIR CHANNEL EQUIPPED FILM FOR USE IN VACUUM PACKAGE", filed Jun. 26, 2002;

U.S. patent application Ser. No. 10/794,149, entitled "LIQUID-TRAPPING BAG FOR USE IN VACUUM PACKAGING," filed concurrently;

U.S. patent application Ser. No. 10/794,349, entitled "METHOD FOR MANUFACTURING LIQUID-TRAPPING BAG FOR USE IN VACUUM PACKAGING," filed concurrently;

U.S. patent application Ser. No. 10/794,951, entitled "SEALABLE BAG HAVING AN INTEGRATED TRAY FOR USE IN VACUUM PACKAGING," filed concurrently;

U.S. patent application Ser. No. 10/794,488, entitled "SEALABLE BAG HAVING AN INDICIA FOR USE IN VACUUM PACKAGING," filed concurrently;

U.S. patent application Ser. No. 10/794,351, entitled "METHOD FOR MANUFACTURING A SEALABLE BAG HAVING AN INDICIA FOR USE IN VACUUM PACKAGING," filed concurrently;

U.S. patent application Ser. No. 10/795,048, entitled "SEALABLE BAG HAVING AN INTEGRATED ZIPPER FOR USE IN VACUUM PACKAGING," filed concurrently;

U.S. patent application Ser. No. 10/794,487, entitled "METHOD FOR MANUFACTURING A SEALABLE BAG HAVING AN INTEGRATED ZIPPER FOR USE IN VACUUM PACKAGING," filed concurrently;

U.S. patent application Ser. No. 10/794,354, entitled "SEALABLE BAG HAVING AN INTEGRATED VALVE STRUCTURE FOR USE IN VACUUM PACKAGING," Attorney Docket No. TILA-01181US2, filed concurrently;

U.S. patent application Ser. No. 10/794,952, entitled "METHOD FOR MANUFACTURING A SEALABLE BAG HAVING AN INTEGRATED VALVE STRUCTURE FOR USE IN VACUUM PACKAGING," Attorney Docket No. TILA-01181US3, filed concurrently;

U.S. patent application Ser. No. 10/794,368, entitled "SEALABLE BAG HAVING AN INTEGRATED TIMER/SENSOR FOR USE IN VACUUM PACKAGING," Attorney Docket No. TILA-01182US2, filed concurrently; and U.S. patent application Ser. No. 10/794,373, entitled "METHOD FOR MANUFACTURING A SEALABLE BAG HAVING AN INTEGRATED TIMER/SENSOR FOR USE IN VACUUM PACKAGING," Attorney Docket No. TILA-01182US3, filed concurrently.

FIELD OF THE INVENTION

The present invention relates to bags for use in vacuum packaging and methods and devices for manufacturing bags for use in vacuum packaging.

BACKGROUND

Methods and devices for preserving perishable foods such as fish and meats, processed foods, prepared meals, and left-overs, and non-perishable items are widely known, and widely varied. Foods are perishable because organisms such as bacteria, fungus and mold grow over time after a food container is opened and the food is left exposed to the atmosphere. Most methods and devices preserve food by protecting food from organism-filled air. A common method and device includes placing food into a gas-impermeable plastic bag, evacuating the air from the bag using suction from a vacuum pump or other suction source, and tightly sealing the bag.

A bag for use in vacuum packaging can consist of a first panel and second panel, each panel consisting of a single layer of heat-sealable, plastic-based film (for example, polyethylene). The panels are sealed together along a substantial portion of the periphery of the panels by heat-sealing techniques so as to form an envelope. Perishable products, such as spoilable food, or other products are packed into the envelope via the unsealed portion through which air is subsequently evacuated. After perishable products are packed into the bag and air is evacuated from the inside of the bag, the unsealed portion is heated and pressed such that the panels adhere to each other, sealing the bag.

U.S. Pat. No. 2,778,173, incorporated herein by reference, discloses a method for improving the evacuation of air from the bag by forming channels in at least one of the panels with the aid of embossing techniques. Air escapes from the bag along the channels during evacuation. The embossing forms a pattern of protuberances on at least one of the panels. The protuberances can be discrete pyramids, hemispheres, etc., and are formed by pressing a panel using heated female and male dies. The first panel is overlaid on the second panel such that the protuberances from one panel face the opposite panel. The contacting peripheral edges of the panels are sealed to each other to form an envelope having an inlet at an unsealed portion of the periphery. The perishable or other products are packed into the envelope through the inlet, and the inlet is sealed. Thereafter, an opening is pierced in a part of the panel material that communicates with the channels, air is removed from the interior of the envelope through the channels and opening, and the opening is sealed. This type of bag requires two additional sealing steps after the perishable or other product is packed into the envelope. One further problem is that embossing creates impressions on the plastic such that indentations are formed on the opposite side of the panel To avoid additional sealing steps, a vacuum bag is formed having a first panel and a second panel consisting of laminated films. Each panel comprises a heat-sealable inner layer, a gas-impermeable outer layer, and optionally, one or more intermediate layers. Such a bag is described in U.S. Pat. No. Re. 34,929, incorporated herein by reference. At least one film from at least one panel is embossed using an embossing mold to form protuberances and channels defined by the space between protuberances, so that air is readily evacuated from the vacuum bag.

U.S. Pat. No. 5,554,423, incorporated herein by reference, discloses still another bag usable in vacuum packaging. The bag consists of a first and second panel, each panel consisting of a gas-impermeable outer layer and a heat-sealable inner layer. A plurality of heat-sealable strand elements are heat bonded at regular intervals to the inner layer of either the first panel or the second panel. The spaces between strand elements act as channels for the evacuation of air. The strand elements are extruded from an extrusion head and heat bonded to the heat-sealable layer by use of pressure rolls. Separate equipment is required for producing strand elements, and a procedure of heat bonding a plurality of strand elements at regular intervals to the heat-sealable inner layer is complicated. Also, various shapes of pattern are hard to form using this process.

BRIEF DESCRIPTION OF THE FIGURES

Further details of embodiments of the present invention are explained with the help of the attached drawings in which.

DETAILED DESCRIPTION

Figure 1A:
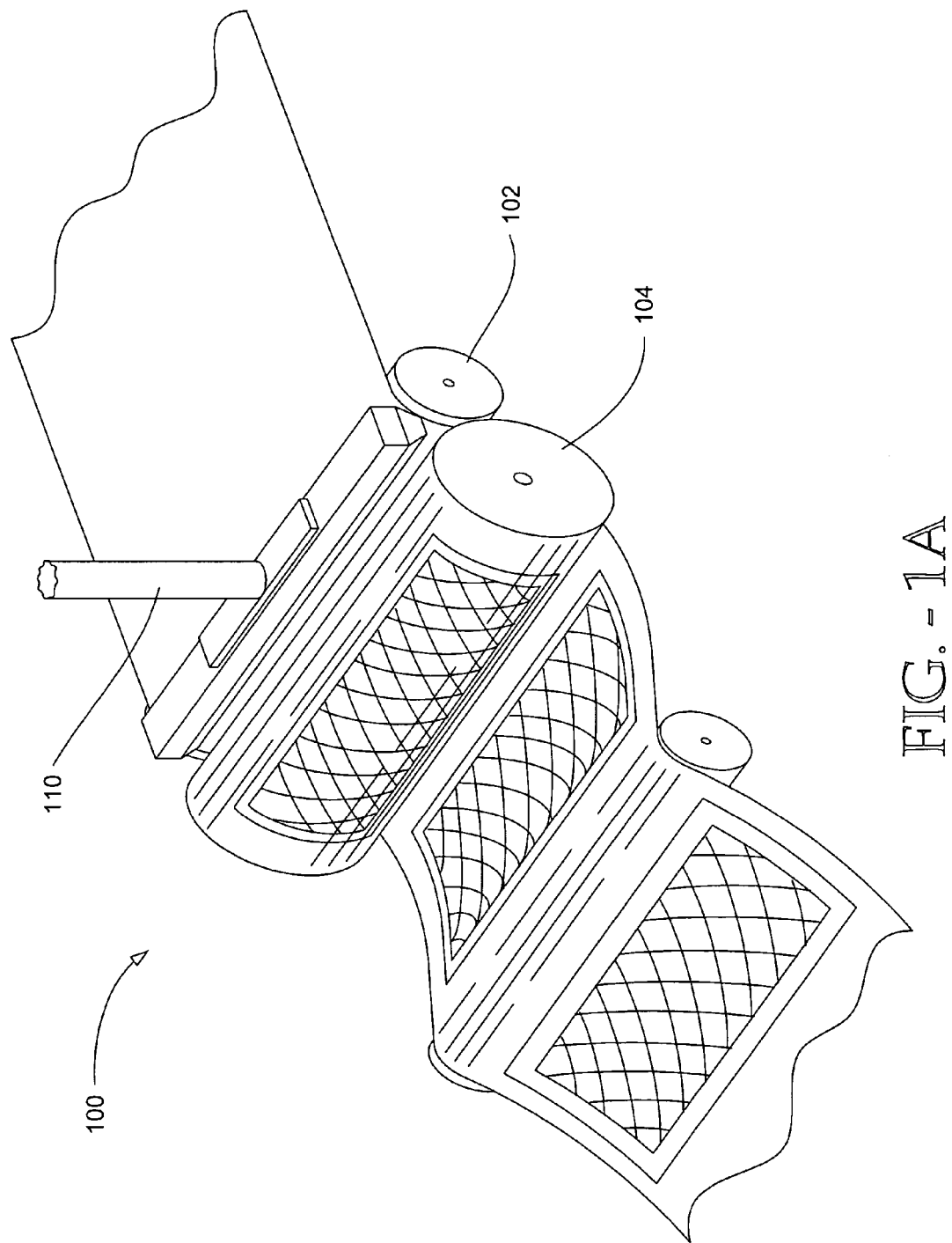
FIG. 1A is a perspective view of a method for manufacturing a vacuum bag in accordance with one embodiment of the present invention.
Figure 1B:
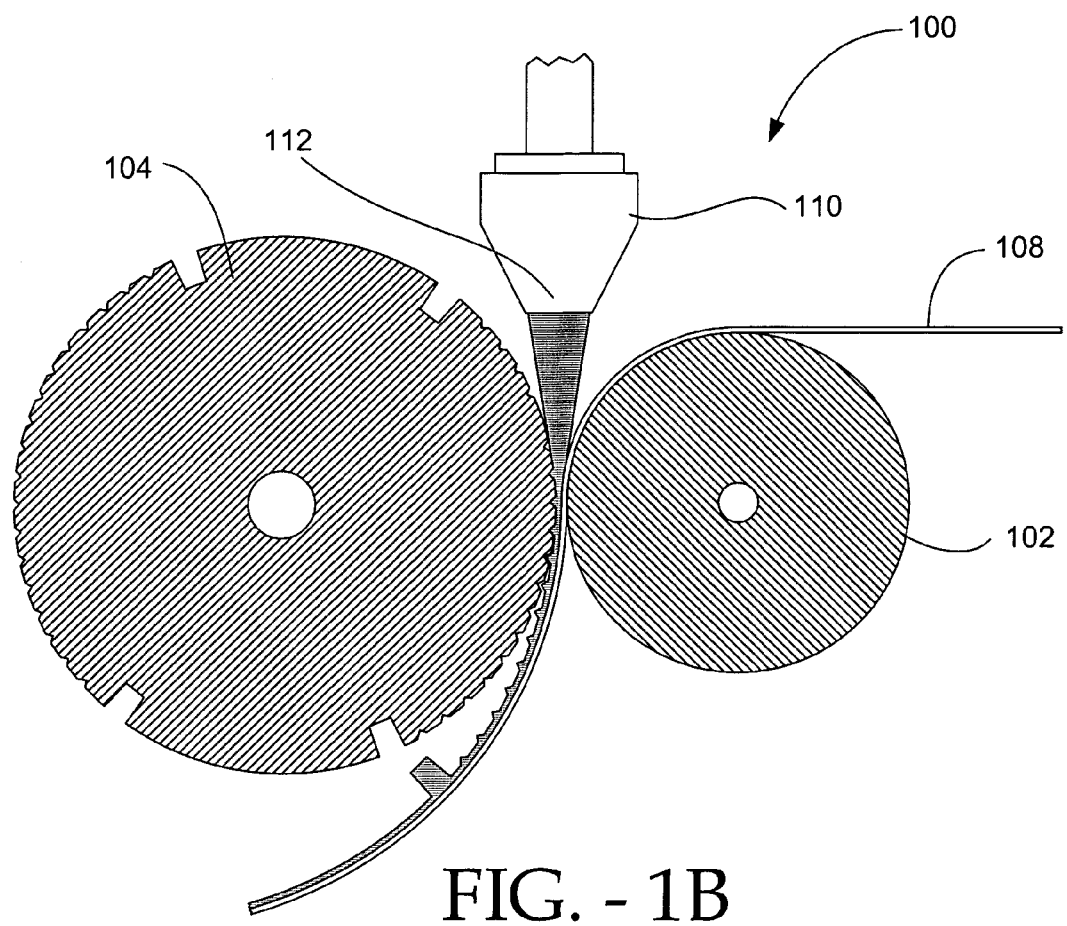
FIG. 1B is a side view of the method shown in FIG. 1A illustrating the embossing method used in an embodiment of the present invention.
Figure 1C:
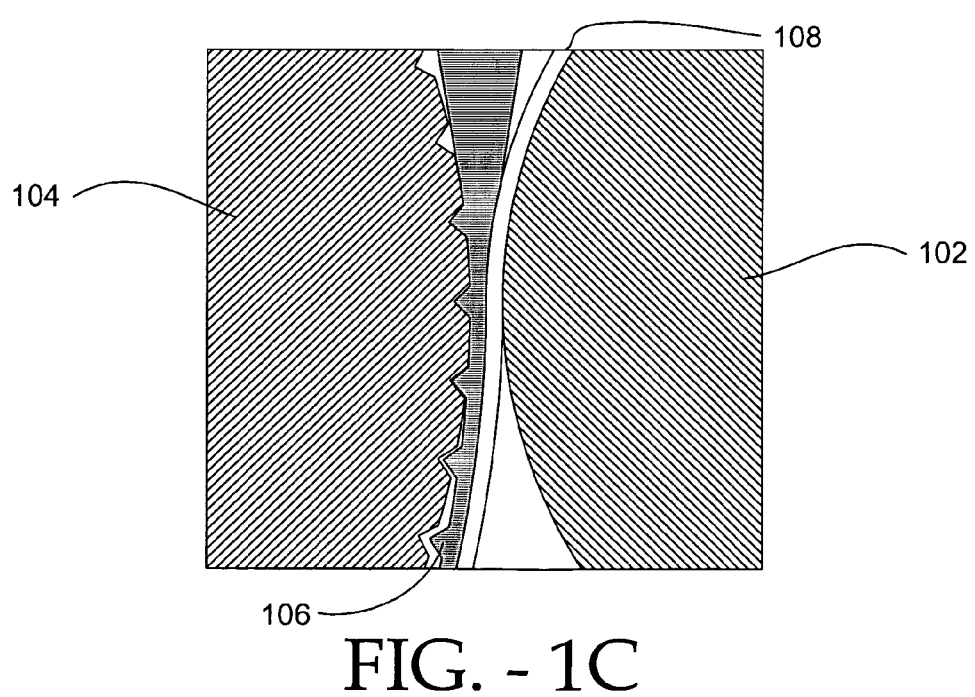
FIG. 1C is a close-up view of a portion of FIG. 1B.

FIGS. 1A–1C illustrate one embodiment of a method for manufacturing a vacuum bag in accordance with the present invention. The vacuum bag comprises a first panel and a second panel, wherein each panel comprises a gas-impermeable base layer 108 and a heat-sealable inner layer 106 with at least one panel having raised walls for preventing shifting of perishable or other product contained inside the vacuum bag. A laminating roll 102 and a cooling roll 104 are arranged so that the heat-sealable inner layer 106 can be laminated to the gas-impermeable base layer 108 as the melt-extruded resin is cooled. As illustrated in FIG. 1C, the gap between the laminating roll 102 and the cooling roll 104 can be controlled according to specifications (for example, thickness) of a panel for use in vacuum packaging. The temperature of the cooling roll 104 is maintained in a range such that the melt-extruded heat-sealable resin is sufficiently cooled to form the desired pattern. For example, a temperature range of about −15° C. to about −10° C. can be sufficient to properly form the desired pattern. The temperature range of the cooling roll 104 can vary according to the composition of the resin, the composition of the gas-impermeable base layer 108, environmental conditions, etc. and can require calibration. Also, the cooling roll 104 can be sized to have a larger diameter than the laminating roll 102, thereby bringing the melt-extruded resin into contact with more cooled surface area. For example, the diameter of the cooling roll 104 can be about one-and-a-half to about three times as large as that of the laminating roll 102.

The heat-sealable inner layer 106 is typically made of a thermoplastic resin. For example, the resin can be comprised of polyethylene (PE) suitable for preserving foods and harmless to a human body. A vacuum bag can be manufactured by overlapping two panels such that the heat-sealable resin layers 106 of the two panels is brought into contact and heat is applied to a portion of the periphery of the panels to form an envelope. The thermoplastic resin can be chosen so that the two panels strongly bond to each other when sufficient heat is applied.

The gas-impermeable base layer 108 is fed to the gap between the cooling roll 104 and the laminating roll 102 by a feeding means (not shown). The gas-impermeable base layer can be comprised of polyester, polyamide, ethylene vinyl alcohol (EVOH), nylon, or other material having similar properties and capable of being used in this manufacturing process, and also capable of being heated. The gas-impermeable base layer 108 can consist of one layer, or two or more layers. When employing a multilayer-structured base layer, it should be understood that a total thickness thereof is also adjusted within the allowable range for the total gas-impermeable base layer 108.

An extruder 110 is positioned in such a way that the melt-extruded resin is layered on the gas-impermeable base layer 108 by feeding the melt-extruded resin to the nip between the cooling roll 104 and the gas-impermeable layer 108. The resin is fed through a nozzle 112 of the extruder 110. The temperature of the melt-extruded resin is dependent on the type of resin used, and can typically range from about 200° C. to about 250° C. The amount of resin to be extruded into the laminating unit 100 is dependent on the desired thickness of the heat-sealable inner layer 106.

A pattern fabricated on the circumferential surface of the cooling roll 104 in accordance with one embodiment of the present invention can include cavities for forming raised walls defining one or more discrete trays. The pattern can also optionally include cavities (and/or protuberances) for forming ridges or protuberances within the raised walls for suspending a perishable or other product over a base of the trays, thereby allowing liquid to collect in the tray. The resin extruded by the nozzle 112 is pressed between the cooling roll 104 and the gas-impermeable base layer 108 and flows into the cavities of the cooling roll 104. The melt-extruded resin quickly cools and solidifies in the desired pattern while adhering to the gas-impermeable base layer 108, thereby forming the heat sealable inner layer 106 of the panel. The heat-sealable inner layer 106 can be formed while the resin is sufficiently heated to allow the resin to flow, thereby molding the resin, unlike conventional methods adopting a post-embossing treatment where the heat-sealable inner layer is drawn by a die or embossed between male and female components.

Figure 2A:
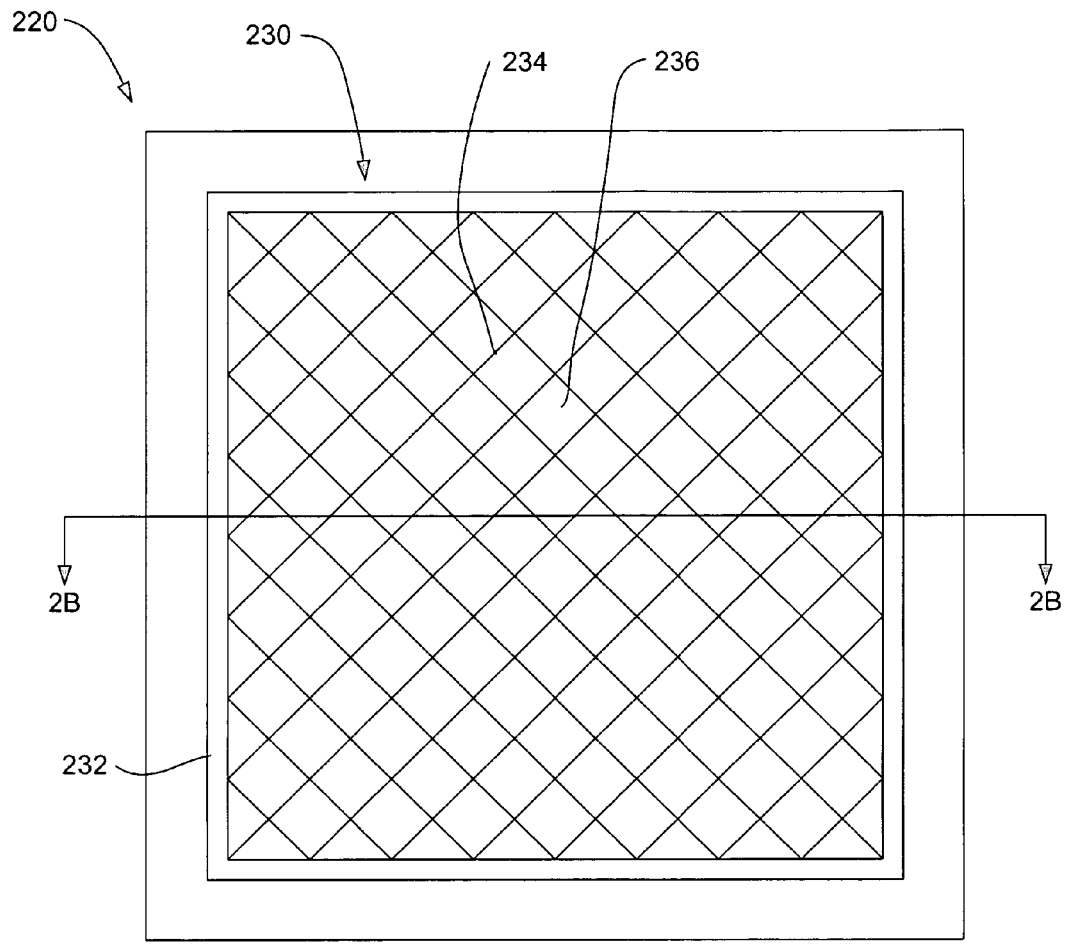
FIG. 2A is a plan view of a panel in accordance with one embodiment of the present invention, manufactured by the process shown in FIG. 1A–1C.

FIG. 2A is a plan view of a panel formed by the cooling roll 104 for use in a vacuum bag, in which the heat-sealable inner layer 106 is molded in such a way that raised walls 232 are formed for defining a tray 230 for restricting the movement of perishable or other products. Within the raised walls 232 of the tray are ridges 234 for suspending the perishable or other products over the base of the tray. As shown, the ridges 234 are cross-hatched and form reservoirs 236 for liquid to collect. In other embodiments, the ridges can be formed in a multitude of different patterns, allowing for the formation of reservoirs 236 having a multitude of different shapes and sizes. In still other embodiments, the tray 230 can include protuberances, wherein the protuberances can be discrete pyramids, hemispheres, etc., thereby allowing liquid to collect evenly in the base of the tray 230. In still other embodiments, the panel 220 can include a plurality of discrete trays 230, each sized to suit an application and optionally having ridges 234 or protuberances. One of ordinary skill in the art can appreciate the myriad of different ways in which the panel 220 can be configured to restrict the movement of perishable products within a vacuum bag.

Figure 2B:
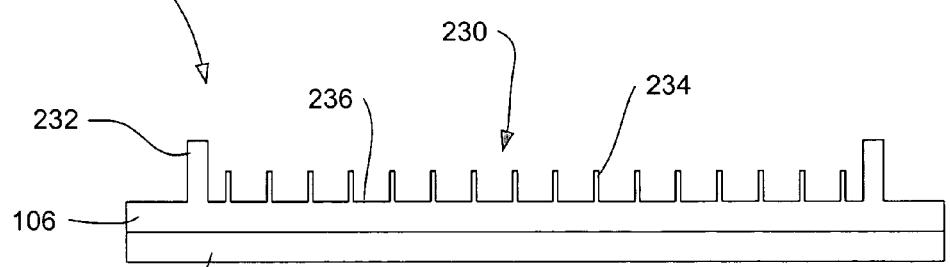
FIG. 2B is a cross-section view of a panel in accordance with one embodiment of the present invention, manufactured by the process shown in FIG. 1A–1C.

The thickness of the raised walls 232 and ridges 234 formed on the heat-sealable inner layer 106 of a panel 220 can be determined by the depth of the cavities of the cooling roll 104, and the width of the raised walls 232 and ridges 234 can be determined by the width of the cavities. Thus, the shape, width, and thickness of the raised walls 232 and ridges 234 can be controlled by changing the specifications for the cavities of the cooling roll 104. FIG. 2B is a cross-sectional view of the panel 220 described above. In the heat-sealable inner layer 106, the raised walls 232 can range, for example, from about 35–75 mils or more in height, the gas-impermeable base layer 108 can range, for example, from about 0.5–8.0 mils in thickness, and the heat-sealable inner layer 106, can range, for example, from about 0.5–6.0 mils in thickness (without the raised walls 232). Optionally, ridges 234 or protuberances can by included. The ridges 234 or protuberances can have a height lower than the raised walls 232, thereby suspending the perishable or other product while still retaining the perishable product within the tray 230. For example, if the raised wall 232 is 75 mils in height, the height of the ridges 234 or protuberances can be about 30 mils. The dimensions of the raised walls 232, the ridges 234, the base layer 108, and the inner layer 106 are set forth to illustrate, but are not to be construed to limit the dimensions.

Figure 3:
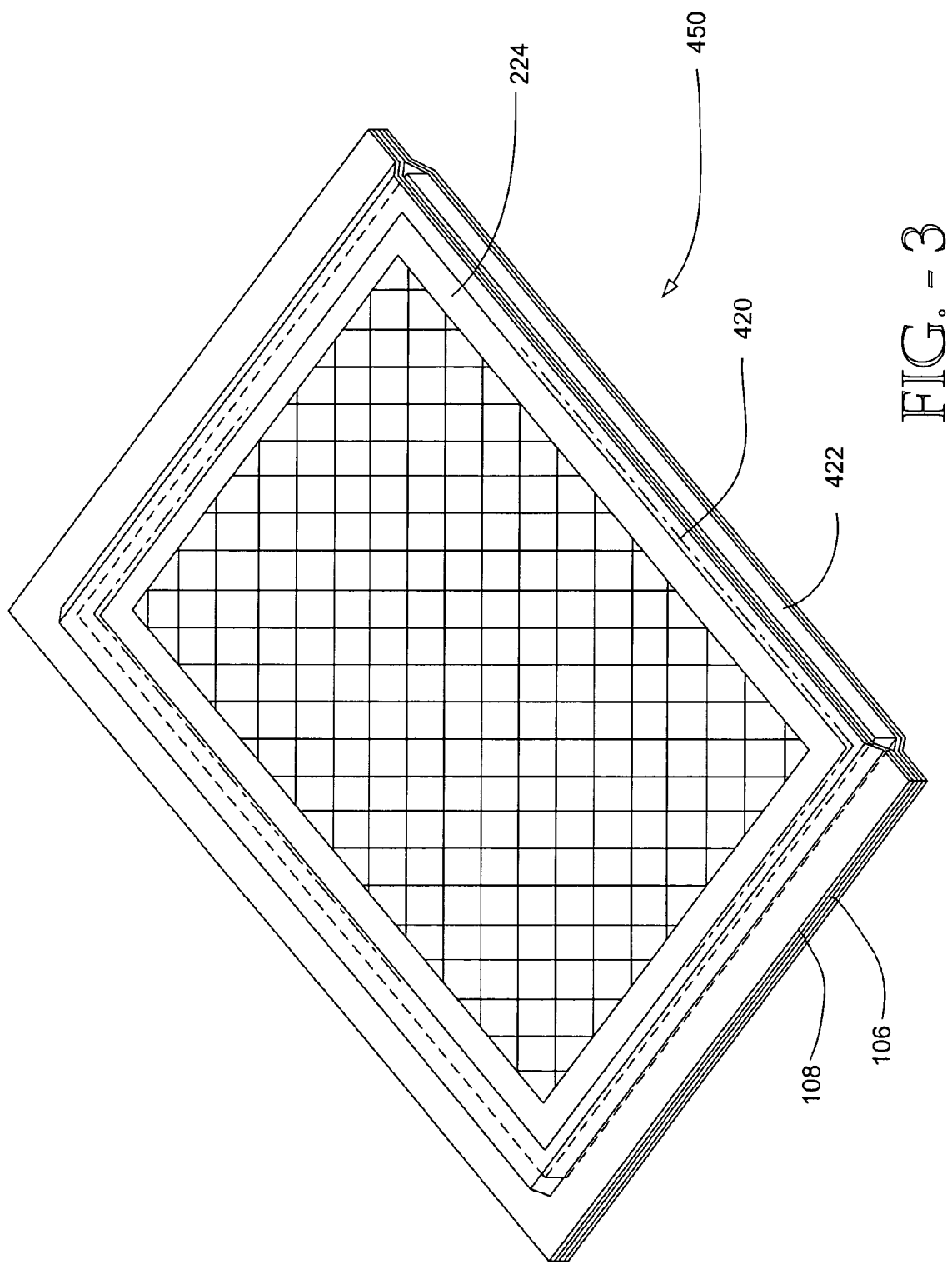
FIG. 3 is a perspective view of a vacuum bag in accordance with one embodiment of the present invention.

FIG. 3 illustrates a bag for use in vacuum packaging in accordance with one embodiment of the present invention. The vacuum bag 350 comprises a first panel 320 and a second panel 322 overlapping each other. At least one tray 230 is formed on the first panel 320 in accordance with an embodiment described above. The second panel 322 (or first panel 320) optionally includes channels (not shown) along a portion of the panel for evacuating air and other gases from the bag. The channels can be formed, for example, as described in the cross-referenced application "LIQUID-TRAPPING BAG FOR VACUUM PACKAGING," incorporated herein by reference. The heat-sealable resin layer 106 and the gas-impermeable base layer 108 of the first and second panels 320,322 are typically made of the same material respectively, but can alternatively be made of different materials that exhibit heat-sealability and gas-impermeability respectively. As described above, the heat-sealable resin layer 106 is used as an inner layer and the gas-impermeable base layer 108 is used as an outer layer. The lower, left, and right edges of the first and the second panel 320,322 are bonded to each other by heating, so as to form an envelope for receiving a perishable or other product to be vacuum packaged. Once a perishable or other product is placed in the vacuum bag 350, air and/or other gases can be evacuated from the bag 350, for example by a vacuum sealing machine as described in U.S. Pat. No. 4,941,310, which is incorporated herein by reference. Once the air and/or other gases are evacuated to the satisfaction of the user, the inlet can be sealed by applying heat, thereby activating the heat-sealable inner layers 106 and bonding them together.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method of manufacturing a bag adapted to receive an article, comprising:
   rotating a first roller having a plurality of recesses that can define one or more trays including a plurality of protuberances, wherein the one or more trays each have raised walls at outer edges for restricting movement of the article;
   rotating a second roller adjacent to the first roller, said second roller can feed a first film adjacent to the first roller;

continuously applying a molten material between the first roller and the film;

said molten material filling the recesses of the first roller, and said molten material and film moving between the first roller and the second roller forming a first panel with a plurality of receptacles;

forming a second panel; and mating the first panel to the second panel in order to form a bag.

2. The method of claim 1, further comprising:

using a gas impermeable material for the film; and using a heat sealable material for the molten material.

3. The method of claim 2, wherein the first panel is formed such that when the article is positioned within the tray, the article is supported by the plurality of protuberances.

4. The method of claim 2, wherein the first panel is formed such that when the article is positioned within the tray, the article is supported above a base of the at least one tray.

5. The method of claim 1, wherein said first roller includes a peripheral surface having a first portion including the plurality of recesses for defining the one or more trays including the plurality of protuberances.

6. A method for manufacturing a bag adapted to receive an article, comprising:

feeding a first gas-impermeable film to a first nip formed by a first cooling roll and a first laminating roll, the first cooling roll having a plurality of cavities for forming at least one tray;

wherein the at least one tray has at least one raised wall at an outer edge for restricting movement of the article;

continuously extruding resin such that the resin fills the first nip and the plurality of cavities exposed to the first nip;

pressing the resin between the first cooling roll and the first laminating roll;

cooling the resin such that a first inner layer having the first structure and the second structure is formed;

wherein the first inner layer adheres to the first gas-impermeable film, thereby forming a first panel;

feeding a second gas-impermeable film to a second nip formed by a second cooling roll and a second laminating roll, the second cooling roll having a plurality of cavities and protuberances for forming a third structure;

wherein the third structure is the other of the receiving feature and the insertion feature;

continuously extruding resin such that the resin fills the second nip and the plurality of cavities exposed to the second nip;

pressing the resin between the second cooling roll and the second laminating roll;

cooling the resin such that a second inner layer having the third structure is formed;

wherein the second inner layer adheres to the first gas-impermeable film, thereby forming a second panel;

overlapping the first panel with the second panel; and applying heat to a first, second, and third side of the first and second panels.

7. A method for forming a bag adapted to receive an article, the bag being partially formed between a laminating roll and a cooling roll having a plurality of cavities for forming a structure, comprising:

feeding a gas-impermeable film to a nip formed by the cooling roll and the laminating roll;

continuously extruding resin such that the resin fills the nip and the plurality of cavities exposed to the nip;

pressing the resin between the cooling roll and the laminating roll;

cooling the resin such that the resin forms the structure and adheres to the gas-impermeable film, forming a panel;

folding the panel such that a first portion of the panel overlaps a second portion of the panel;

applying heat to a first, second, and third side of the first and second portions such that an envelope is formed; and wherein the structure includes one or more trays having a plurality of protuberances, and the one or more trays each have raised walls at outer edges for restricting movement of the article.

8. A method for manufacturing a bag adapted to receive an article, comprising:

feeding a first gas-impermeable film to a first nip formed by a first cooling roll and a first laminating roll, the first cooling roll having a plurality of cavities for forming a structure;

wherein the structure is one or more trays having a plurality of protuberances;

wherein the one or more trays each have raised walls at outer edges for restricting movement of the article;

continuously extruding resin such that the resin fills the first nip and the plurality of cavities exposed to the first nip;

pressing the resin between the first cooling roll and the first laminating roll;

cooling the resin such that the resin forms the structure and adheres to the first gas-impermeable film, forming a first panel;

feeding a second gas-impermeable film to a second nip formed by a second cooling roll and a second laminating roll;

continuously extruding resin such that the resin fills the second nip;

pressing the resin between the second cooling roll and the second laminating roll;

cooling the resin such that the resin adheres to the second gas-impermeable film, forming a second panel;

overlapping the first panel with the second panel;

applying heat to a first, second, and third side of the first and second panels such that an envelope is formed; and wherein the structure includes one or more trays having a plurality of protuberances.

9. A method for manufacturing a bag adapted to receive an article, comprising:

rotating a first cooling roll at a first rate, the first cooling roll including a plurality of cavities for forming a structure;

wherein the structure includes one or more trays having a plurality of protuberances;

where the one or more trays each have raised walls at outer edges for restricting movement of the article;

rotating a first laminating roll at a second rate;

introducing a first film to a first nip between the first cooling roll and the first laminating roll;

continuously extruding molten material to the first nip;

pressing the molten material between the first cooling roll and the first film such that the molten material fills the plurality of cavities exposed to the first nip;

cooling the molten material such that a first inner layer is formed;

wherein the first inner layer includes the structure;

wherein the first inner layer adheres to the first film, thereby forming a first panel;

rotating a second cooling roll at a third rate;

rotating a second laminating roll at a fourth rate;

introducing a second film to a second nip between the second cooling roll and the second laminating roll;

extruding molten material to the second nip;

pressing the molten material between the second cooling roll and the second film;

cooling the molten material such that a second inner layer is formed;

wherein the second inner layer adheres to the second film, thereby forming a second panel;

overlapping the first panel with the second panel; and applying heat to a portion of a periphery of the first and second panels such that the first panel and the second panel form an envelope.

10. The method of claim 9, wherein the second rate is an integer multiple of the first rate and the fourth rate is an integer multiple of the third rate.

11. The method of claim 9, wherein the first film and the second film comprise at least one layer.

12. The method of claim 11, wherein the at least one layer comprises a gas-impermeable material.

13. The method of claim 12, wherein the gas-impermeable material is one of polyester, polyamide, ethylene vinyl alcohol, and nylon.

14. The method of claim 9, wherein the molten material is polyethylene.

15. The method of claim 9, wherein a thickness of the first inner layer is determined by the size of the first nip and the thickness of the second inner layer is determined by the size of the second nip.

16. The method of claim 9, wherein the structure is formed such that when the article is positioned within the tray, the article is supported by the plurality of protuberances.

17. The method of claim 9, wherein the structure is formed such that when the article is positioned within the tray, the article is supported above a base of the at least one tray.

* * * * *